(No Model.)
I. N. SPEER & H. G. McLEAN.
FILTER.
No. 592,742. Patented Oct. 26, 1897.
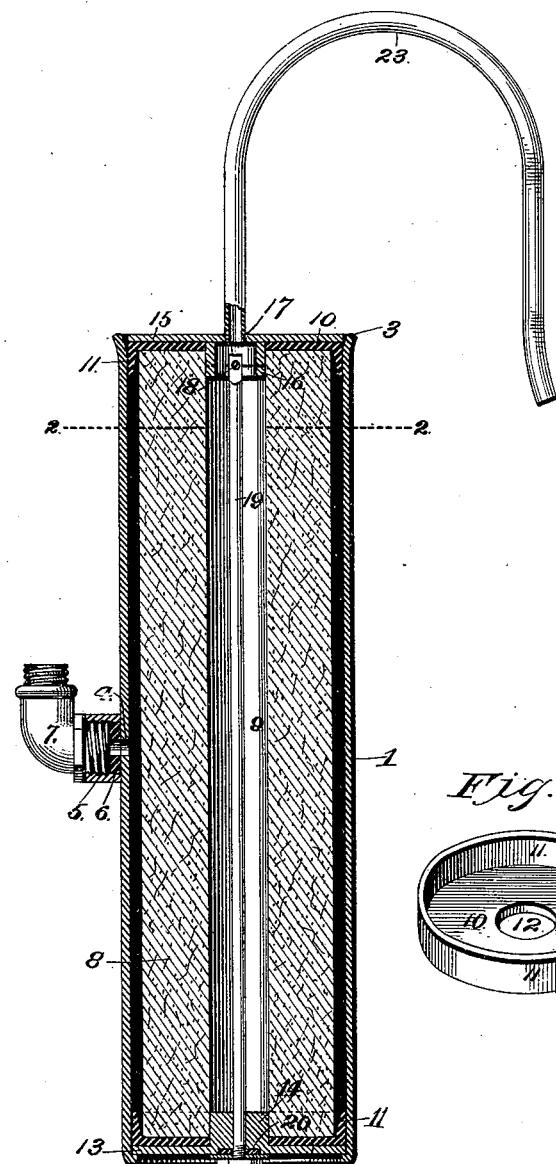
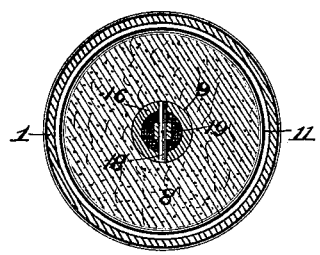
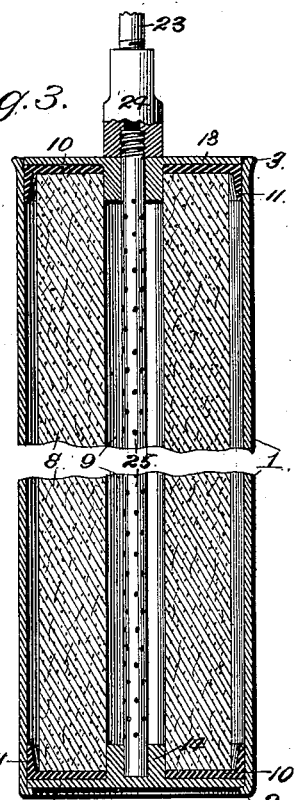
Witnesses:
G. W. Thorpe
M. R. Remley
Inventors:
I. N. Speer & H. G. McLean
By Hixson & Hixson
Attys.

UNITED STATES PATENT OFFICE.

ISAAC N. SPEER, OF KANSAS CITY, AND HORACE G. McLEAN, OF RACINE, MISSOURI, ASSIGNORS, BY DIRECT AND MESNE ASSIGNMENTS, TO GEORGE A. WELLS, OF ST. LOUIS, MISSOURI.

FILTER.

SPECIFICATION forming part of Letters Patent No. 592,742, dated October 26, 1897.

Application filed October 26, 1895. Serial No. 567,041. (No model.)

*To all whom it may concern:*

Be it known that we, ISAAC N. SPEER, of Kansas City, Jackson county, and HORACE G. McLEAN, of Racine, Newton county, Missouri, have invented certain new and useful Improvements in Filters, of which the following is a full, clear, and exact description, reference being had to the accompanying drawings, forming a part thereof.

Our invention relates to appliances for separating impurities and all foreign substances from water and other liquids, and more particularly to that class of filtration devices which are adapted to be used in connection with water or liquid under pressure—for instance, upon water-pipes, &c.; and the objects of the invention are to produce a filter of such construction that it will perform its proper function in a thorough and reliable manner, which may be readily placed in or removed from operative position relative to the supply pipe or faucet, and from which the filtration substance may in a few seconds be extracted, thoroughly cleansed, and replaced in the casing of the filter.

A further object of the invention is to produce a filter of this character which is simple, strong, durable, and inexpensive of construction.

With these objects in view the invention consists in certain novel and peculiar features of construction and combinations of parts, as will be hereinafter described, and pointed out in the appended claims.

In order that the invention may be fully understood, reference is to be had to the accompanying drawings, in which—

Figure 1 represents a vertical longitudinal section of a filter embodying our invention. Fig. 2 represents an irregular cross-section of the same, taken on the heavy dotted lines 2 2. Fig. 3 represents a vertical longitudinal section, partly broken away, of a slightly-modified form of construction. Fig. 4 represents a detail perspective view of one of the washers.

In the said drawings, where similar numerals refer to corresponding parts, 1 designates a cylinder which is open at both ends. It is, however, provided at its lower end with the inwardly-turned flange 2 and at its upper end is outwardly flared, as shown at 3. The flange 2, as hereinafter more particularly referred to, is adapted to support the filtration substance, together with the end plates and the washers, in their proper positions relative to the cylinder, and the outwardly-flared end 3 is to facilitate the insertion of said parts into the cylinder.

4 designates a perforation in the cylinder 1 about midway its length, and 5 a concentrically-surrounding tube or collar.

6 designates a washer, of rubber or equivalent material, which is located in said tube and is provided with a central aperture which registers with the perforation 4.

7 designates an elbow, which is shown as screwed into the tube or collar 5 and which is adapted at its opposite end to be screwed into the mouth of a faucet or other liquid-conductor, which in practice will be provided with the customary valve, so that when the water-supply is cut off from the filter the latter will not be subjected to any pressure.

Referring now to the removable part of the filter, 8 designates a cylinder, of tripoli or other porous stone or substance, and 9 designates the central bore or passage thereof.

10 designates washers, of rubber or equivalent material, which are preferably cemented upon the ends of the filtration substance and are provided with inwardly-projecting annular flanges 11, which overlap the ends of said stone. Said flanges are preferably tapered at their inner sides, as shown, to more positively and reliably expand under the pressure of water and effectually close the open ends of the cylinder. Said washers are provided with central openings 12, which register with the passage 9.

13 designates one end plate of the filter. Said end plate equals in diameter the washers 10 and is provided with a cylindrical boss 14 at its middle, which projects through the opening 12 of the interposed washer and into the contiguous end of the passage 9 of the cylinder 8.

15 designates the opposite end plate of the filter, and said end plate is provided with a tubular boss 16, which projects through the opening 12 of the interposed washer and into the opposite end of said passage 9. It is also provided centrally with a threaded aperture or perforation 17 and with a pin 18, extending diametrically across and secured at its opposite ends to the tubular boss 16. A rod 19 is pivotally mounted at one end upon the pin 18 and has its opposite end screw-threaded and projecting through registering openings in the boss 14, the flexible washer 20, the metallic washer 21, and the clamping-nut 22. Said clamping-nut is employed to cause the end plates 13 and 15 to bear with a firm and unyielding pressure against the interposed washers 10 and the ends of the cylinder 8.

23 designates the discharge pipe or tube, which is preferably bent to inverted-U shape or gooseneck form, and is secured at one end in the opening 17.

When in operative position, the parts occupy the relative positions shown in the drawings, where it will be noticed that the diameter of the filtering substance 8 is of size to provide an annular space between the same and the cylinder or casing. The end plates and washers fit snugly within the cylinder. Thus it will be seen that the filter essentially consists of the casing or cylinder, which is mounted upon the end of the water-supply pipe in such manner that it can be quickly and easily removed, and the filtration substance and the ends of the cylinder, which are clamped against and removable bodily together as a single part.

In practice the water enters the space surrounding the filtering-stone and seeks to escape at first at the ends of the cylinder. This is impossible, however, owing to the fact that immediately the pressure is felt by the flanges 11 of the washer they respond by expanding within the cylinder and preventing the escape of a single drop of water at such points with the assistance of the end plates, which prevent the water from forcing said flanges directly outward. Owing to their beveled internal formation this expansive effect is more positively and reliably provided for than would be the case if said flanges were of the same thickness throughout, though it is to be understood that the appliance works satisfactorily in either case, provided said flanges loosely embrace the cylinder that the water may enter between. Even if the flanges fit perfectly tight in said space, the effect will be the same, because the pressure of water upon the ends thereof will tend by direct compression to increase their thickness, as will be readily understood.

It is also apparent that this filter possesses decided advantages over the great majority of filters at present in use in that it may be cleansed at any time by an unskilled person by simply grasping the tube 23 and lifting the parts connected thereto from the cylinder and wiping the same with a sponge or cloth or scraping the porous cylinder slightly, if necessary. It may be then replaced in position. It is not necessary to remove the cylinder to cleanse it, because it is open at both ends and can be cleaned thoroughly by reciprocating a rag or sponge therethrough and causing the same to frictionally engage the inside of the cylinder.

Referring now to Fig. 3, it will be noticed that we dispense with the end plate 15, having the tubular boss, and use in lieu thereof a pair of end plates 13. Said end plates 13 are the same in all essential respects as the end plate 13 of Fig. 1, except that the openings are larger preferably, and in one of them it does not extend clear through. (See lower end plate, Fig. 3.) In lieu of the pivot-rod 19 we may employ the perforated pipe 25, which connects said end plates and is coupled at one end by the coupling-nut 24 to the gooseneck 23. This coupling-nut 24 is substantially the equivalent in function of the nut 22, as it is employed to clamp the washers, through the medium of the end plates, firmly against the ends of the porous cylinder. In operation the water in this instance seeps through the filtering substance as before and then enters the perforated pipe and escapes thence by way of the coupling-nut 24 and the tube 23, as before.

We have found in practice that unless the bosses of the end plates perfectly fit the opposite ends of the passage 9 the end plates will not bear with equal pressure at all points upon the washer 10, and therefore the latter may under such conditions permit of the escape of drops of water the whole time the filter is in use. We have successfully overcome this difficulty by employing in lieu of said perfectly rigid construction the pivot-rod 9, which will permit the end plates to adapt themselves to any slight irregularities in the surface of the stone, and therefore bear with equal pressure upon all points of the interposed washers 10. As the constructions, however, are equivalent, and that illustrated in Fig. 3 operates as well as the other when perfect connections are made, we prefer to illustrate them together.

From the above description it will be apparent that we have produced a filter which embodies all the desirable features enumerated in the statement of invention.

We also wish it to be distinctly understood that changes in the form, arrangement, and construction of parts may be resorted to without departing from the spirit and scope of our invention, which broadly consists in a two-part filter—one the stationary cylinder open at both ends and the other the filtration substance—washers, end plates, the rod extending through the porous cylinder and connecting the end plates, and the discharge-tube, which latter, however, may be flexible or of any preferred construction.

It is to be understood also that this filter may be employed in a horizontal position as well as vertically. The flange 2 may be dispensed with also, if desired, when the appliance is arranged horizontally, owing to the fact that the pressure of the water or other liquid being equal at both ends holds the filtering substance and the parts connected thereto properly in position.

Having thus described our invention, what we claim as new, and desire to secure by Letters Patent, is—

1. A filter, comprising a casing or cylinder, open at both ends and provided with a perforation, a porous cylinder fitting loosely therein and provided with a central bore or passage, washers of yielding material at the ends of the porous cylinder, and provided with flanges which project into the space between the same and the casing or cylinder, end plates bearing against the outer sides of the said washers, a tie-rod connecting said end plates, and a clamping-nut engaging said tie-rod to secure the end plates and the washers in proper position relative to the porous cylinder, substantially as set forth.

2. A filter, comprising a casing or cylinder, open at both ends, flared at one end and flanged inwardly at the other, a porous cylinder within the same and provided with a central bore or passage, washers at the ends of the porous cylinder and provided with annular flanges which project into the space between the porous cylinder and the casing, end plates bearing against the outer sides of said washers, and one of them resting upon the flange of the casing, bosses projecting inwardly from said plates into the ends of said bore or passage, a rod connected at one end to one of said bosses and having its opposite screw-threaded end extending through the said parts, a clamping-nut engaging said end of the rod, a washer or packing-ring surrounding said rod and clamped against said boss, and a discharge-tube to convey the filtered liquid from the bore or channel, substantially as set forth.

3. A filter, comprising a casing or cylinder, open at both ends, flared at one end and flanged inwardly at the other, a porous cylinder within the same and provided with a central bore or passage, washers at the ends of the porous cylinder and provided with annular flanges which project into the space between the porous cylinder and the casing, end plates bearing against the outer sides of said washers, and one of them resting upon the flange of the casing, bosses projecting inwardly from said plates into the ends of said bore or passage, a rod extending axially of said bore and pivotally connected at one end upon a cross-pin of one of said bosses and having its opposite screw-threaded end projecting through the other boss, a clamping-nut engaging said threaded end, and a discharge-tube communicating with said bore or passage through the end plate having the tubular boss provided with said cross-pin, substantially as set forth.

In testimony whereof we affix our signatures in presence of two witnesses.

ISAAC N. SPEER.
HORACE G. McLEAN.

Witnesses:
G. Y. THORPE,
M. R. REMLEY.